United States Patent [19]

McKenzie et al.

[11] Patent Number: 4,477,082

[45] Date of Patent: Oct. 16, 1984

[54] ARCHERY TARGET WITH REPLACABLE TARGET SEGMENT

[76] Inventors: Larry G. McKenzie, P.O. Box 480, Granite Quarry, N.C. 28072; Leon T. Powell, Rte. 13, Box 52, Salisbury, N.C. 28144

[21] Appl. No.: 447,432

[22] Filed: Dec. 6, 1982

[51] Int. Cl.³ ............................................. F41J 3/00
[52] U.S. Cl. .................................... 273/403; 403/381; 273/407; 446/97
[58] Field of Search ...................... 273/403, 407, 408; 46/22, 25; 403/381

[56] References Cited

U.S. PATENT DOCUMENTS

| | | | |
|---|---|---|---|
| 858,090 | 6/1907 | Meincke | 46/22 |
| 1,818,939 | 8/1931 | Brading | 273/403 |
| 1,954,242 | 4/1934 | Heppenstall | 403/381 |
| 2,774,609 | 12/1956 | Winger | 403/381 X |
| 2,812,947 | 11/1957 | Fatzinger et al. | 273/404 |
| 2,923,551 | 2/1960 | Pope | 46/25 X |
| 3,163,418 | 12/1964 | Myers | 46/22 X |
| 3,164,384 | 1/1965 | Stewart | 273/403 |
| 4,019,298 | 4/1977 | Johnson | 403/381 X |
| 4,054,288 | 10/1977 | Perrine, Sr. | 273/408 X |
| 4,066,261 | 1/1978 | Stewart | 273/403 |
| 4,239,236 | 12/1980 | Parham et al. | 273/404 X |

FOREIGN PATENT DOCUMENTS 1547162 8/1968 France .................................. 46/22

OTHER PUBLICATIONS

Archery, 7-1967, p. 50.

Primary Examiner—Paul E. Shapiro
Attorney, Agent, or Firm—W. Thad Adams, III

[57] ABSTRACT

A three-dimensional archery target (10) is disclosed comprising first and second body segments (11 and 12) having a shape simulating the forward and rearward extremities, respectively, of an animal and a replacable target segment (15) having a shape corresponding to the central trunk of a corresponding animal for being matingly and detachably positioned between the first (11) and the second (12) body segments to collectively define the entire body portion of a corresponding animal. Target segment (15) is comprised of a lightweight, semi-rigid, tangle-free and non-healing material adapted for controlled disintegration from arrow impact. Male dovetails (16, 18) and female dovetails (20, 21) releasably retain the target segment (15) between the first and second body segments (11, 12) in resistance to force in one direction caused by the impact of arrows thereon and to force in the opposite direction caused by removal of the arrows.

11 Claims, 6 Drawing Figures

ARCHERY TARGET WITH REPLACABLE TARGET SEGMENT

TECHNICAL FIELD AND BACKGROUND OF THE INVENTION

This invention relates to a three-dimensional archery target with a replacable target segment. The archery target has an overall shape simulating an animal such as a white tail deer. The replacable target segment is located in the physiological target area of the corresponding animal. While the specific disclosure of this application includes a target having a shape simulating that of a white tail deer, the invention is applicable to animals of many other sizes and shapes.

Single piece, lightweight foam animal targets are known. These targets approximate the size and shape of the corresponding live animal even though the actual, primary target area approximates the location of the upper chest cavity in the region of the heart and lungs. Since this area comprises the primary aiming point, the target in this area is relatively quickly destroyed, even though the other areas of the target are only slightly damaged. The primary target area of the target will accept only so many strikes before it disintegrates into several pieces, meaning the entire target must be replaced. This involves a substantial expenditure, especially when relatively large targets are concerned. The problem is particularly acute when broadhead arrows are used for target practice. Broadhead arrows comprise a plurality of intersecting razor blades which taper to a sharp point. When the arrow hits the target, the razor blades slice through the target material to a considerable depth. As the target material is hit repeatedly, pieces of the target are cut loose. Therefore, a target is destroyed much more rapidly with a broadhead arrow than with field point or target head arrows.

Several prior art patents disclose targets with replacable segments. The Stewart U.S. Pat. No. 4,066,261 discloses a target made of three layers of expanded polyethelyne plastic. This particular plastic exhibits a "self-closing" or "healing" characteristic intended to permit the target to resist distruction for a much longer period of time. The target includes a central segment (16) which can be periodically replaced when destroyed. The replacable plug is of the same composition as the remainder of the target and has a frusto-conical shape.

The Parham et al. U.S. Pat. No. 4,239,236 discloses a backup member which is secured to the reverse side of a target proximate the central zone, which is occupied by a replacable bullseye plug. The backup member is a pillow-like pad contained within a cloth sleeve. The replacable bullseye 20 is provided with a shoulder which prevents rearward displacement of the bullseye when hit by arrows.

The Brading U.S. Pat. No. 1,818,939 discloses a target having an envelope of loose fabric such as burlap and stuffed with tow, lint or some other impact absorbing material.

The Stewart U.S. Pat. No. 3,164,384 discloses an archery target made of rubberized horsehair, hogs hair, straw or the like. Parts of the target damaged by repeated hits can be cut out and replaced by a plug cut from a piece of the rubberized hair.

Finally, the Fatzinger et al. U.S. Pat. No. 2,812,947 discloses a target constructed in a mache fashion with burlap straps cemented to a longitudinal diaphram of uncured rubber or the like. The target may be either hollow or filled with impact absorbing material and does not have replacable parts.

For a number of reasons the prior art patents discussed above are particularly unsuitable for use with broadhead arrows. In the Stewart '261 patent the target is constructed of a self-closing and healing material to cause the target holes to close up and the target to last for a longer period. This material is not suitable for use with broadhead arrows because the plastic material will close in around the back of the arrowhead, making it difficult or impossible to remove. In addition, the frusto-conical shape of the replacable bullseye would cause it to pull loose from the target when attempting to remove the broadhead arrow.

The Parham et al. patent includes a pillow-like pad contained within a cloth sleeve, the fabric of which would tangle with the broadhead arrow and prevent withdrawal. Also, the shape of the replacable target segment would cause it to be removed together with the broadhead arrow, since it is held in place within the target only by friction. The Brading and Fatzinger structures are likewise unsuitable for use with broadhead arrows because of the presence of fibrous and/or rubber materials which would tangle and ensnare the broadhead point.

SUMMARY OF THE INVENTION

Therefore, it is an object of the present invention to provide a three-dimensional archery target simulating an animal and having a replacable segment for use with broadhead arrows.

It is another object of the present invention to provide a three-dimensional archery target comprised of a lightweight, semi-rigid, tangle-free and non-healing material adapted for controlled disintegration from arrow impact and from which broadhead arrows can be withdrawn without damage to the arrowhead or shaft.

It is another object of the present invention to provide a three-dimensional archery target simulating an animal and having a replacable segment for use with broadhead arrows and which includes means for releasably retaining a target segment and body segment of the target together in resistance to force in one direction caused by the impact of the arrows thereon and to force in the opposite direction caused by removal of the arrows.

It is yet another object of the present invention to provide a three-dimensional archery target simulating an animal and having a replacable target segment with a shape corresponding to the shape of the physiological target area of an animal, in order that the target segment may be discarded and replaced when it has disintegrated to a point making further use impractical.

These and other objects and advantages of the present invention are achieved in the preferred embodiment of the archery target disclosed below by providing a body segment having a shape corresponding to the shape of at least a part of an animal. A replacable target segment is matingly and detachably connected to the body segment and has a shape corresponding to the shape of the physiological target area of the animal. The replacable target segment is comprised of a lightweight, semi-rigid, tangle-free and non-healing material adapted for controlled disintegration from arrow impact and from which broadhead arrows can be withdrawn without damage to the arrowhead or shaft. The body segment and target segment together define the shape of a corresponding live animal. The archery target also includes means for releasably retaining the target segment and the body segment together in resistance to force in one direction caused by the impact of arrows thereon, and to force in the opposite direction caused by removal of the arrows.

According to one preferred embodiment of the invention a three-dimensional archery target comprises first and second body segments, the first body segment having a shape simulating the forward extermity of an animal and the second body segment having a shape simulating the rearward extremity of an animal. A replacable target segment with a shape corresponding to the central trunk of a corresponding animal is matingly and detachably positioned between the first and second body segments to collectively define the entire body portion of a corresponding animal.

According to a preferred embodiment of the invention the lightweight material comprises polyurethane foam, with the target segment having a higher density than the body segments.

Preferably, the means for releasably retaining the target segment and the body segment together comprises a male dovetail on one of the body and target segments and a female dovetail on the other of the body and target segments for receiving the male dovetail. The male and female dovetails are oriented in longitudinally extending vertical alignment thereby preventing relative lateral movement of the body and target segments. According to a further preferred embodiment of the invention, the dovetails have a decreasing tapered width from top to bottom in order to maintain vertical alignment between the target segment and body segments.

BRIEF DESCRIPTION OF THE DRAWINGS

Some of the objects of the invention have been set forth above. Other objects and advantages of the invention will appear as the description of the invention proceeds, when taken in conjunction with the following drawings, in which.

DESCRIPTION OF THE PREFERRED EMBODIMENT

Figure 1:
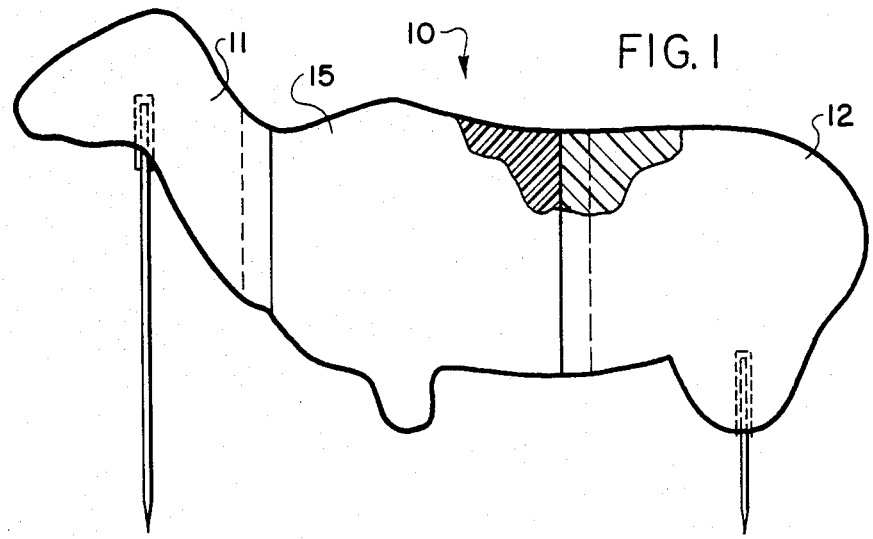
FIG. 1 is a vertical cross-sectional view of a three-dimensional archery target according to the present invention.

Referring now specifically to the drawings, a preferred embodiment of the three-dimensional archery target according to the present invention is shown in FIG. 1 and broadly designated at reference numeral 10. The particular embodiment of target 10 shown in FIG. 1 has a shape approximating that of a white tail deer. However, the target 10 may take the shape and size of any desired animal. Target 10 is comprised of a first body segment 11 which simulates the forward extremity of a white tail deer and a second body segment 12 which simulates the rearward extremity of a white tail deer. First and second body segments 11 and 12 are molded of polyurethane foam. Positioned intermediate body segments 11 and 12 is a target segment 15. Collectively, body sements 11 and 12 and target segment 15 define the entire body portion (omitting the legs) of a white tail deer. Target segment 15 is also formed of molded polyurethane foam.

Figure 2:
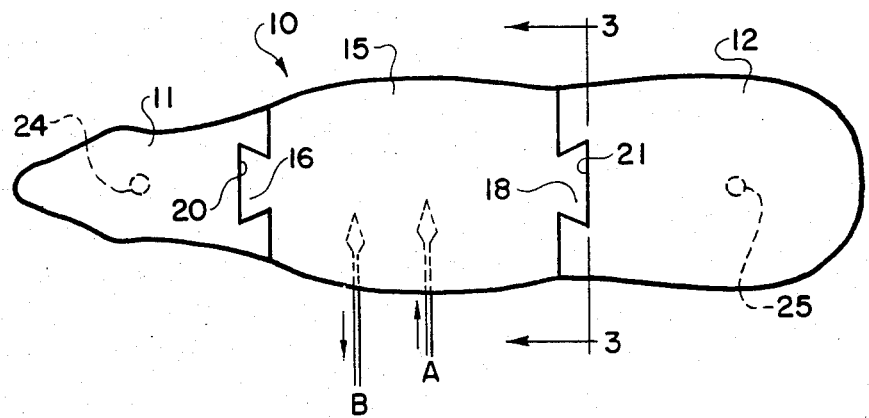
FIG. 2 is a horizontal cross-section of the three-dimensional archery target shown in FIG. 1.
Figure 3:
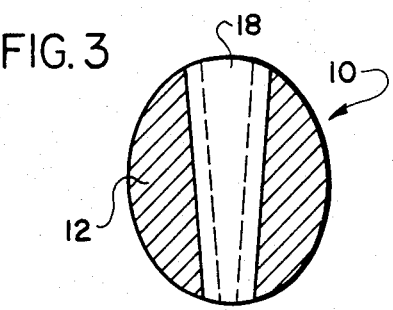
FIG. 3 is a lateral, vertical cross-sectional view taken substantially along lines 3—3 in FIG. 2.

Referring now to FIG. 2, means are provided for releasably retaining target segment 15 between body segments 11 and 12, which comprise a pair of male dovetails 16 and 18 which are integrally formed on opposing ends of target segment 15 and which fit into mating, female dovetails 20 and 21 integrally formed into body segments 11 and 12, respectively. To illustrate the function and purpose of this structure, two broadhead arrows A and B (see FIG. 6) are shown in target segment 15. As is illustrated by the pointer adjacent arrow A, the dovetail structure resists the tendency of arrow A to force the target segment 15 rearwardly as it impacts. Likewise, as is shown by the pointer adjacent arrow B, forward movement of target segment 15 upon withdrawal of the broadhead point, which is specifically designed to resist easy withdrawal, is also resisted by the dovetails 16 and 18.

Figure 4:
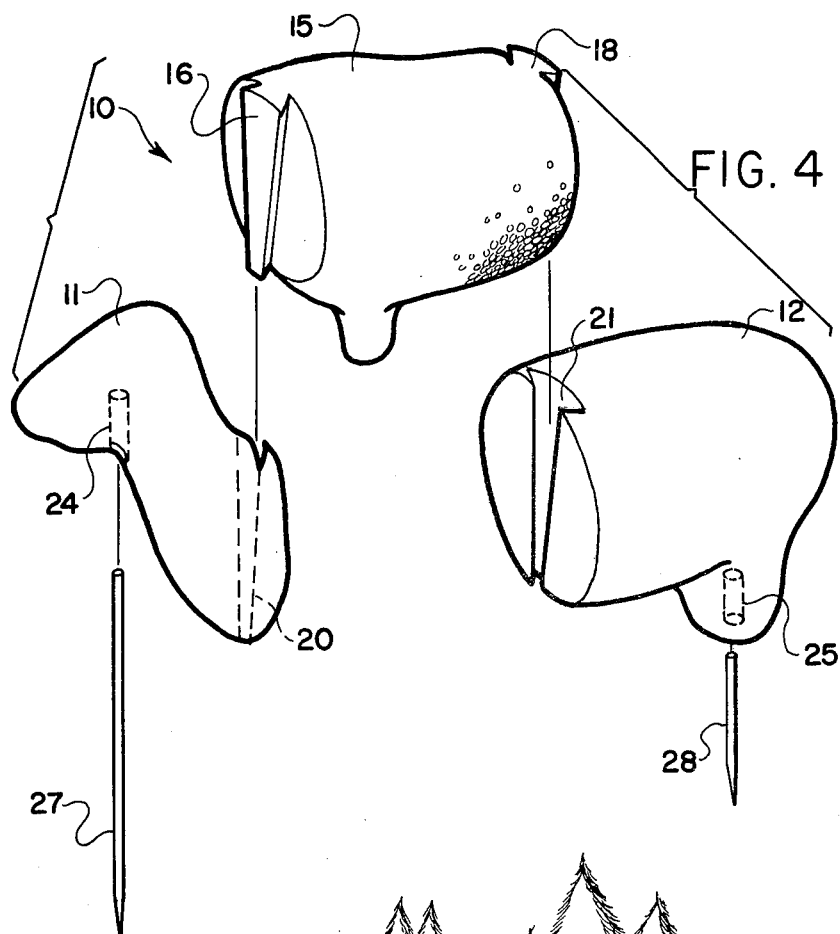
FIG. 4 is an exploded perspective view of a three-dimensional archery target according to the present invention.

Referring now to FIG. 4, it can be seen that male dovetails 16 and 18 have a decreasing tapered width from top to bottom, as do female dovetails 20 and 21. Target segment 15 is inserted into position from the top and the mating arrangement of tapered dovetails 16, 18 and 20, 21, respectively, automatically position target segment 15 in proper alignment with body segments 11 and 12. Furthermore, any further downward movement of target segment 15 relative to body segments 11 and 12, even under the downward impact of arrows, is prevented by this arrangement. To disassemble target 10 or to replace a disintegrated target segment 15, target segment 15 is moved upwardly. The upward movement is facilitated because once the upward movement of target segment 15 begins, the decreasing width of male dovetails 16 and 18 substantially eliminates friction between the respective male and female dovetails.

Figure 5:
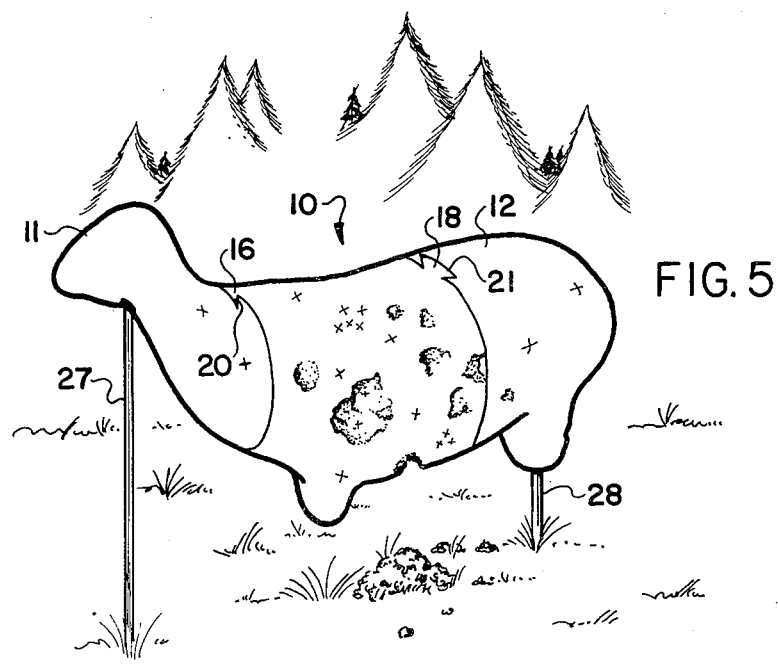
FIG. 5 is a perspective, environmental view of the archery target shown in FIG. 4 with the controlled disintegration of the target segment illustrated.

Target 10 may be supported in position for use in a number of ways. One way is shown in FIGS. 1 and 4 and comprises two relatively short lengths of pipe or tubing 24 and 25, one being molded into the underside of body segment 11 and the other into the underside of body segment 12. Preferably, the top ends of pipes 24 and 25 are capped. To use the target, two shafts 27 and 28, for example, steel reinforcing bars, are driven into the ground a suitable distance apart. The assembled archery target 10 is lowered onto shafts 27 and 28 which are positioned within pipes 24 and 25, respectively, and support target 10 at a suitable distance above the ground, as is shown in FIG. 5.

Figure 6:
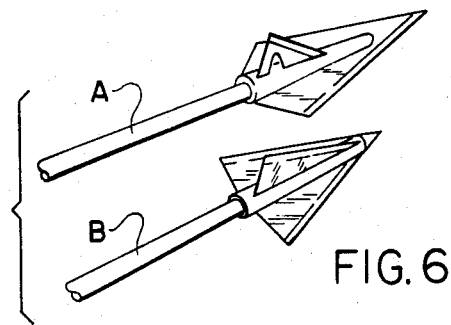
FIG. 6 is a perspective view of two common types of broadhead arrow points.

FIG. 6 illustrates two conventional types of broadhead arrow points. The deltoid shape of the point, however, is specifically designed to prevent easy withdrawal of the arrow. This feature makes the use of a resiliant or "spongy" foam target material completely unappropriate when broadhead arrows are being used. The polyurethane foam of which target 10 is constructed is not a resilient foam but is best characterized as "semi-rigid" in that it can be deformed slightly but retains that deformed shape instead of returning to its original shape. When a broadhead arrow impacts this semi-rigid material, the blades of the point enter the foam, causing an "X"-shaped cut. The foam cuts cleanly rather than being deformed and therefore does not close around the back of the arrow making withdrawal of the arrow difficult. Repeated hits of a broadhead arrow in the same area eventually causes a mass of intersecting cuts which slice small pieces of foam away from the target. Over a period of time, gradual disintegration takes place as more and more small pieces of foam are cut from the target. Eventually, target segment 15 is replaced. Usually, target segment 15 will absorb the vast majority of target hits, especially with a skilled archer. Therefore, body segment 11 and 12 need not be replaced at the same time as target segment 15. Furthermore, since the body segments 11 and 12 are not expected to absorb a large number of hits, these segments can be constructed of a much less dense material, thereby substantially reducing weight and saving needless additional expense. In a typical construction, the density of the foam may range from 2-6 lbs/cu/ft (32-96 kg/cu/m), with the target segment 15 density towards the high end of this range and the body segments 11 and 12 toward the lower end.

The foam is intended specifically to be tangle-free and non-healing and of a uniform consistency to permit controlled disintegration from repeated arrow hits.

A three-dimensional archery target is described above. Various details of the invention may be changed without departing from its scope. Furthermore, the foregoing description of a preferred embodiment according to the present invention is provided for the purpose of illustration only and not for the purpose of limitation—the invention being defined by the claims.

We claim:

1. A three-dimensional archery target simulating an animal and having a replacable segment for use with broadhead arrows, and comprising:
   (a) A body segment having a shape corresponding to the shape of at least a part of an animal;
   (b) A replacable target segment for being matingly and detachably connected to said body segment and having a shape corresponding to the shape of the physiological target area of an animal and comprised of a lightweight, semi-rigid, tangle-free and non-healing material adapted for controlled disintegration from arrow impact and from which broadhead arrows can be withdrawn without damage to the arrowhead or shaft, said body segment and target segment together defining the shape of an animal, said target segment comprises a foam having a relatively high density and wherein said body segment comprises a relatively lower density in order to enable the replacement target segment to withstand the impact of arrows for a longer period.
   (c) Means for releasably retaining said target segment and said body segment together in resistance to force in one direction caused by the impact of arrows thereon and in force in the opposite direction caused by removal of the arrows.

2. An archery target according to claim 1 wherein said lightweight material comprises polyurethane foam.

3. An archery target according to claim 1 and including means for supporting the archery target in vertically spaced-apart relation to a supporting surface.

4. An archery target according to claim 3 wherein said means for supporting the archery target comprises the opposing extremities of said archery target each being provided with a void, each void adapted to receive and support said archery target upon an upright support shaft.

5. An archery target according to claim 1 wherein said means for releasably retaining said target segment and said body segment together in resistance to force in one direction caused by the impact of arrows thereon and to force in the opposite direction caused by removal of the arrows, comprises a male dovetail on one of the said body and target segments and a female dovetail on the other of said body segments and target segments for receiving said male dovetail, said male and female dovetails oriented in longitudinally extending, vertical alignment thereby preventing relative lateral movement of said body and target segments relative to each other.

6. An archery target according to claim 5 wherein said male and female dovetails have a mating and decreasing taper width from top to bottom adapted to align said body segment and said target segment in proper relation and to prevent further downward movement of said target segment relative to said body segment.

7. A three-dimensional archery target simulating the shape of an animal and having a replacable segment for use with broadhead arrows and comprising:
   (a) First and second body segments, said first body segment having a shape simulating the forward extremity of an animal and said second body segment having a shape simulating the rearward extremity of an animal;
   (b) a replacable target segment having a shape corresponding to the central trunk of a corresponding animal for being matingly and detachably positioned between said first and second body segments to collectively define the entire body portion of a corresponding animal; said target segment being comprised of a lightweight, semi-rigid, tangle-free and non-healing foam material adapted for controlled disintegration from arrow impact and from which broadhead arrows can be withdrawn without damage to the arrowhead or shaft, wherein said target segment comprises a foam having a relatively high density and said first and second body segments have a relatively lower density in order to enable the replacable target segment to withstand the impact of arrows for a longer period;
   (c) Means for releasably retaining said target segment between said first and second body segments in resistance to force in one direction caused by the impact of arrows thereon and to force in the opposite direction caused by removal of arrows.

8. An archery target according to claim 7 wherein said lightweight material comprises polyurethane foam.

9. An archery target according to claim 7 and including means for supporting the archery target in vertically spaced-apart relation to a supporting surface, said means for supporting the archery target comprising the opposing extremities of said archery target each being provided with a void, each void adapted to receive and support said archery target upon an upright support shaft.

10. An archery target according to claim 7 wherein said means for releasably retaining said target segment and said first and second body segments together in resistance to force in one direction caused by the impact of arrows thereon and to force in the opposite direction caused by removal of the arrows, comprises a male dovetail on one of the said target segments and first and second body segments and a female dovetail on the other of said target segments and first and second body segments for receiving said male dovetail, said male and female dovetails oriented in longitudinally extending, vertical alignment thereby preventing relative lateral movement of said body and target segments relative to each other.

11. An archery target according to claim 7, wherein said male and female dovetails have a mating and decreasing taper width from top to bottom adapted to align said first and second body segments and said target segments in proper relation and to prevent further downward movement of said target segment relative to said first and second body segments.

* * * * *